Patented Nov. 20, 1928.

1,692,784

UNITED STATES PATENT OFFICE.

JOHN W. ORELUP, OF EAST ORANGE, AND O. IVAN LEE, OF JERSEY CITY, NEW JERSEY, ASSIGNORS, BY MESNE ASSIGNMENTS, TO BOYCE-ITE PRODUCTS, INCORPORATED, OF CINCINNATI, OHIO, A CORPORATION OF OHIO.

FUEL AND FUEL INGREDIENTS.

No Drawing. Application filed January 23, 1925. Serial No. 4 255

This invention relates to fuels for internal combustion engines and to ingredients for treating such fuels.

It is chiefly concerned with a liquid fuel which has the property of eliminating "carbon" from the cylinders of an engine, and preventing the formation of such "carbon".

The "carbon" found in an engine is a deposit built up on the internal walls and parts of an internal combustion engine, of carbon precipitated from the incomplete combustion of the fuel, of road dust sucked in through the carburetor, and of binder products resulting from polymerization or decomposition of the lubricating oil as well as decomposition products of the fuel.

It is a well known fact that "carbon" reduces the efficiency of an engine in that it causes knocking or detonation, pits the valve, and interferes with the lubrication.

In accordance with the present invention a composition or ingredient is provided which is adapted to be added directly to liquid fuel of ordinary characteristics, such for instance as gasoline, thereby producing a blended or treated fuel which has the property of preventing or reducing the formation of carbon in the engine in which it is used, and which also tends to wholly or partly eliminate carbon which may already be present in the engine.

The composition of the ingredient to be added to the fuel is preferably of such a nature as to be directly soluble therein, in which case it may be merely mixed with the fuel without the use of any other ingredient. In some cases, however, if it is not readily soluble, or if it is desired to increase the volume of the ingredient for ease in handling or mixing, it may be dissolved in or mixed with a blender or carrier of suitable nature. It is, furthermore, evident that the composition used should be of such a nature as not to cause corrosion in the engine or its related auxiliaries, and should not precipitate out of the fuel nor cause the formation of any gum or residue in the carburetor or parts of the engine.

The substances which we have discovered to be active are the higher fatty or aliphatic acids and their related compounds. These compounds include the esters, amides, metallic salts, and halogenated compounds of the said acids.

As examples of the acids which may be used are myristic, linolic, ricinoleic, stearic, hydroxy stearic, lauric, oleic, iso-oleic, palmitic, capronic, caprylic, caprinic, arachidic, elaidic, erucic, elaeo-stearic, margaric, and elaeomargaric.

As examples of esters are the methyl, ethyl, butyl, propyl, aryl, and glycerol compounds of the foregoing acids.

As examples of amides are capronic, stearic, lauric, oleic, and ricinoleic amides.

As examples of the halogenated compounds are the chloro, bromo, or iodo derivatives of the above noted acids.

As examples of metallic salts are the cerium, iron, manganese, magnesium or nickle compounds of the said acids.

As examples of blenders are benzol, toluol, xylol, and orthonitrotoluol.

In the use of the said active substances with ordinary fuels, such as gasoline, we have discovered that comparatively low concentrations are very effective in bringing about the desired results. The proportion of the ingredients used will vary more or less with the activity of the particular ingredient, the rapidity and effectiveness of the result which it is desired to obtain, and the limitation of cost which it is desired to impose, and which is usually determined by commercial considerations. For some of the compounds mentioned a concentration of one-tenth of one percent (.1 of 1%) by weight of the composition to the fuel has been found satisfactory, and results can be obtained to a certain extent with less than this amount. On the other hand, a very considerably larger amount of the compound may be used, for instance up to as much as 3% or more, but such large percentages are not recommended, as any additional results which are obtained do not appear to warrant the increase of cost. Where blending or carrying agents are employed, it is usually desirable to use only sufficient quantities to carry the active substance into the solution or to provide sufficient bulk for convenient handling of the ingredient, particularly where the same is to be put up in small containers for use by the general public.

As a specific example of a composition which has been found satisfatcory when mixed with ordinary commercial gasoline as a fuel for automobile engines of usual type, we may mention ethyl oleate, palmitate or stearate or a mixture of two or more of these esters, used in the proportion of 1/10 of 1% by weight to the gasoline. A very good mixture which also has a low freezing point consists of the above-named esters with ethyl lauriate, the lauriate being in the largest proportion, for instance, about 60%. The mixture or substance may be mixed directly with the gasoline, as it is entirely soluble therein, or for convenience of handling it may be first mixed with equal parts of ortho-nitrotoluol as a blending agent. Ortho-nitrotoluol is particularly desirable for this purpose and it has also been found to have a beneficial action as an ingredient of motor fuels.

The exact action of the substances mentioned in causing the elimination of "carbon" from internal combustion engines is not yet definitely known. It appears, however, that the deposition of "carbon" first takes place on the cylinder walls and internal parts of the engine and then the carbon is removed by a detergent action of these active substances. It is definitely known, however, that the percentage of CO is reduced and the percentage of $CO_2$ is increased in the exhaust gases by the addition of some of these active substances to the fuel. Therefore, these compounds cause more perfect combustion to occur in an internal combustion engine with consequent reduction in carbon deposit.

While for the purposes of illustration we have mentioned certain particular substances which may be used in carrying out our invention, we do not intend to be limited thereto, but intend to cover our invention broadly in whatever form its principles may be embodied.

What we claim is:

1. A hydrocarbon fuel suitable for automobile use containing ethyl esters of the higher fatty acids in the approximate proportion of 1/10 of one per cent as a carbon removing agent.

2. A fuel mixture comprising over 97 per cent gasoline and less than 3 per cent of the esters of the higher fatty acids.

3. A fuel mixture comprising over 97 per cent gasoline, less than 3 per cent of the esters of the higher fatty acids, and a blender.

4. A composition adapted to be mixed with hydrocarbon fuels of the gasoline type comprising esters of the higher fatty acids and orthonitrotoluol as a blender.

5. A fuel mixture comprising gasoline and ethyl esters of the higher fatty acids including ethyl laureate.

6. A fuel composition comprising gasoline and a small amount of a mixture containing approximately 40 per cent of ethyl esters of the higher fatty acids exclusive of lauric acid and about 60 per cent of ethyl laureate.

In testimony whereof we have affixed our signatures to this specification.

JOHN W. ORELUP.
O. IVAN LEE.